US006463059B1

(12) United States Patent
Movshovich et al.

(10) Patent No.: US 6,463,059 B1
(45) Date of Patent: Oct. 8, 2002

(54) DIRECT MEMORY ACCESS EXECUTION ENGINE WITH INDIRECT ADDRESSING OF CIRCULAR QUEUES IN ADDITION TO DIRECT MEMORY ADDRESSING

(75) Inventors: Alek Movshovich, Santa Clara; Robert H. Hoem, San Jose; Niranjan A. Puttaswamy, Santa Clara; Brian Lai, Milpitas, all of CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/205,480

(22) Filed: Dec. 4, 1998

(51) Int. Cl.[7] .......................... H04L 12/56; H04L 12/54
(52) U.S. Cl. ...................... 370/389; 370/429; 370/535; 725/151
(58) Field of Search ................................ 370/312, 352, 370/358, 360, 366, 389, 390, 392, 412, 413, 420, 421, 428, 429, 474, 493, 535, 536, 542; 725/143, 151, 153

(56) References Cited

U.S. PATENT DOCUMENTS

| 5,920,572 | * | 7/1999 | Whashington et al. ...... 370/535 |
| 6,032,190 | * | 2/2000 | Bremer et al. .............. 709/238 |
| 6,088,355 | * | 7/2000 | Mills et al. ................. 370/392 |
| 6,208,643 | * | 3/2001 | Dieterich et al. ........... 370/389 |
| 6,226,291 | * | 5/2001 | Chauvel et al. ............. 370/252 |
| RE37,222  | * | 6/2001 | Yonemitsu et al. .... 375/240.16 |

OTHER PUBLICATIONS

Texas Instruments 1394 Product Bulletin, *Mixed Signal & Analog Products*, Copyright 1998.
Texas Instruments 1394 Product Bulletiin p. 2, *Mixed Signal & Analog Products*, Copyright 1998.
Adam J. Kunzman and Alan T. Wetzel, *1394 High Performance Serial Bus: The Digital Interface for ATV*, Texas Instruments.

* cited by examiner

Primary Examiner—Hassan Kizou
Assistant Examiner—Ahmed Elallam
(74) Attorney, Agent, or Firm—Peter Zawliski

(57) ABSTRACT

A method for enhancing transport packet demultiplexing and distribution in a digital transport demultiplexing system that inputs a stream of digital multimedia transport packets is provided. Each of the transport packets includes a packet identifier (PID) to identify the digital program or elementary stream to which it corresponds. Local packet information is generated for each of the transport packets, which is used in identifying and distributing the transport packets. A local header is created that includes the generated local packet information, and the local header is linked to its corresponding transport packet to create a modified transport packet. In this manner, each of the modified transport packets represents a self-contained digital transport packet having local distribution information contained therein. A transport stream demultiplexing apparatus for use in a digital transmission system capable of providing a plurality of digital transport packets to a digital program presentation device is provided. The demulitplexing apparatus performs the demultiplexing operation by creating a set of direct memory access (DMA) instructions for a DMA engine to execute when transferring the transport packets to one or more output queues. The DMA engine is also configured to descramble the contents of the transport packets while the DMA operation occurs.

25 Claims, 11 Drawing Sheets

DIRECT MEMORY ACCESS EXECUTION ENGINE WITH INDIRECT ADDRESSING OF CIRCULAR QUEUES IN ADDITION TO DIRECT MEMORY ADDRESSING

FIELD OF THE INVENTION

The present invention relates generally to digital audio/video program and transport stream demultiplexing. More particularly, this invention relates to a system and method for demultiplexing and distributing transport packets, such as MPEG-2 transport packets, by generating and associating a locally-generated header with each of the transport packets to create a self-contained modified packet which incorporates essential distribution information therein.

BACKGROUND OF THE INVENTION

The development of digital video technology has made possible a variety of telecommunication applications, including video conferencing, video telephony, high-definition television (HDTV), and motion pictures at our desktops to name but a few. The multi-media explosion, including still pictures, moving video, and audio, is already proliferating the threads of the World Wide Web. Technological advances in digital video are presenting new opportunities as well, such as for existing quality television distribution, interactive television, and movies and news on demand.

In order to reduce the high cost of video compression codecs and resolve manufacturer equipment interoperability issues, standardization of digital video techniques has been a high priority. Furthermore, as the computer, telecommunications, and consumer electronics industries continue to amalgamate, the need for standardization becomes more prevalent. To address these and other issues, the International Organization for Standardization (ISO) has undertaken efforts to provide standards for various multi-media technologies, including digital video and audio. The expert group of the ISO that has undertaken this obligation is the Moving Picture Experts Group (MPEG). While the MPEG-1 standards addressed many of the issues facing digital video transmission today, they were not suited for broadcast environments or television applications. Therefore, the ISO developed the MPEG-2 standard (ISO/IEC 13818) to respond to these needs.

The MPEG-2 standard does not, however, define each part of the digital link. This allows for expansion and enhancement of the market via the technology industry. For example, while the MPEG-2 defines a format that can be used to describe a coded video bitstream, it does not specify the encoding method. Instead, it defines only the resulting bit stream.

The MPEG-2 standard is often associated with the video compression aspect of digital video. While video compression is an important part of the MPEG standards, MPEG-2 includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the format with which audio or video information is represented.

Another important part of the MPEG-2 standard is the MPEG-2 Systems portion (ISO/IEC 13818-1). At some point, the video, audio, and other digital information must be multiplexed together to provide encoded bitstreams for delivery to the target destination. The Systems portion of the standard defines how these bitstreams are synchronized and multiplexed together. Typically, video and audio data are encoded at respective video and audio encoders, and the resulting encoded video and audio data is input to an MPEG-2 Systems encoder/multiplexer. This Systems multiplexer can also receive other inputs, such as control and management information, private data bitstreams, and time stamp information. The resulting coded, multiplexed signal is referred to as the MPEG-2 transport stream. More specifically, it is referred to as the transport stream where the digital information is delivered via a network to be displayed in real time, and is referred to as a program stream where a local media-based system is used (e.g., CD-ROM, local hard disk, etc.).

The video and audio encoders provide encoded information to the Systems multiplexer provide this information in the form of an "elementary stream". The encoded output of a video encoder provides a video elementary stream, and the encoded output of an audio encoder provides an audio elementary stream. In each of these cases, the elementary stream can be organized into "access units", which can represent a picture or an audio frame depending on whether it is part of the video or audio elementary stream. These elementary streams are "packetized" into packetized elementary streams (PES) which are comprised of many PES packets. Each PES packet is size-variable, and includes a packet payload corresponding to the data to be sent within the packet, and a PES packet header that includes information relating to the type, size, and other characteristics of the packet payload. The PES packet payloads are not fixed-length, which allows the packet payload to correspond to the access unit of its particular elementary stream.

PES packets from the video and audio encoders are mapped into transport stream packets (TSP) at the Systems encoder/multiplexor. Each TSP includes a payload portion which corresponds to a fixed-length portion of the PES packet stream, and further includes a TSP header. The transport stream packet header provides information used to transport and deliver the information stream, as compared to the PES packet header that provides information directly related to the elementary stream. Although one PES packet may occupy multiple transport packets, byte "stuffing" is used to fill the remainder of a transport packet payload which was not completely filled by a PES packet, thereby allowing each PES header to be positioned at the beginning of the transport packet payload. This allows the PES header to be more easily synchronized at the decoder.

The consecutive flow of transport stream packets form the MPEG transport stream. MPEG-2 Systems provide for two types of transport streams. The first is the single program transport stream (SPTS), which contain different PES streams, but share a common time base. The multi-program transport stream (MPTS) is a multiplex of various single program transport streams, which in turn may be multi-plexed into various network channels for multi-channel delivery to the media user.

The challenge then becomes determining an efficient manner to extract the desired information from the program or transport stream for decoding at the video, audio, or other decoders. Before the transport stream is decoded, the transport packets must undergo analysis, synchronization, demultiplexing, as well as other packet manipulating functions. These functions can be managed by devices such as a MPEG transport demultiplexor, and must be managed properly to execute the functions in the most efficient manner possible to enhance packet transport speed and ease. Due to the extraordinarily high data transfer requirements associated with motion video, packet throughput time is a paramount concern.

One problem affecting the efficiency of such transport demultiplexors is high overhead associated with a host processor transferring the large amount of data contained within the data packets. Accordingly, there is a need for a system and method for enhancing transport packet demultiplexing and distribution in a digital transport demultiplexing system. The present invention allows the transport packet demultiplexing system to manage packet storage and packet attribute information in an efficient and organized manner. The present invention therefore offers advantages and provides solutions to shortcomings of the prior art.

SUMMARY OF THE INVENTION

The present invention is directed to a system and method for demultiplexing and distributing transport packets, such as MPEG-2 transport packets, by generating and associating a locally-generated header with each of the transport packets to create a self-contained modified packet which incorporates essential distribution information therein.

In accordance with one embodiment of the invention, a method for enhancing transport packet demultiplexing and distribution in a digital transport demultiplexing system that inputs a stream of digital multimedia transport packets is provided. Each of the transport packets includes a packet identifier (PID) to identify the digital program or elementary stream to which it corresponds. Local packet information is generated for each of the transport packets, which is used in identifying and distributing the transport packets. A local header is created that includes the generated local packet information, and the local header is linked to its corresponding transport packet to create a modified transport packet. In this manner, each of the modified transport packets represents a self-contained digital transport packet having local distribution information contained therein.

In accordance with another aspect of the invention, a transport stream demultiplexing apparatus for use in a digital transmission system capable of providing a plurality of digital transport packets to a digital program presentation device is provided. The demulitplexing apparatus performs the demultiplexing operation by creating a set of direct memory access (DMA) instructions for a DMA engine to execute when transferring the transport packets to one or more output queues. The DMA engine is also configured to de-scramble the contents of the transport packets while the DMA operation occurs.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

Figure 1:
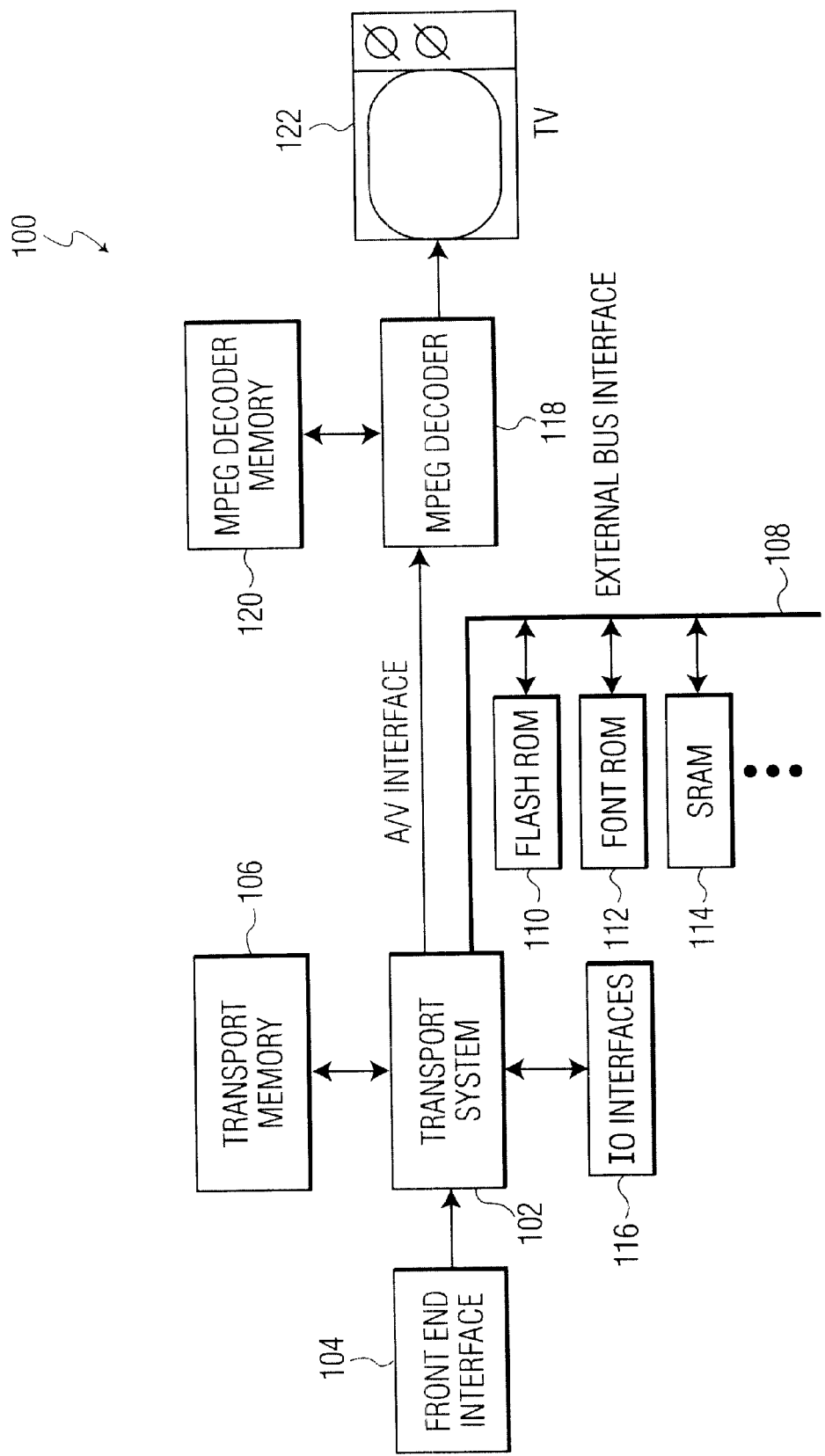
FIG. 1 is a block diagram of an illustrative set-top box system implementation incorporating a digital video transport system in accordance with the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in digital multimedia communications systems implementing the MPEG (Moving Pictures Experts Group) standards such as the MPEG-1 (ISO/IEC 11172-X) and MPEG-2 (ISO/IEC 13818-X) standards, and in transport stream applications relating to digital video in broadband networks. While the present invention may be applicable to many digital communication environments, an appreciation of the invention is best obtained in the context of the following diagrams, in which an MPEG-2 transport stream demultiplexing system is shown according to the present invention.

FIG. 1 is a block diagram of an illustrative set-top box 100 system implementation incorporating a digital video transport system 102 in accordance with the present invention. A set-top box is one of the key components of the modem information superhighway, and is the module that can turn an ordinary television into a sophisticated, interactive, video/audio system. The set-top box can take on a variety of roles, including: serving as a gateway to subscription and pay-per-view services digitally delivered by satellite, cable or terrestrial links; information-on-demand and other interactive services; low cost entrance to the Internet; games console for advanced 3-D video games, and more.

The input of the set-top box 100 includes the front end interface 104. The front end interface 104 which includes satellite, cable and terrestrial demodulators to receive the transport packets. The transport packets are provided to the digital video transport system 102, which in the present embodiment is an MPEG-2 transport system. The MPEG-2 transport system 102 of the present invention provides various functions, including transport stream synchronization and demultiplexing, cached processing capabilities for transport and application processing, dynamic random access memory (DRAM) control for the transport memory 106, external system interfacing via the external bus interface 108 to various external components such as the flash read only memory (ROM) 110, the font ROM 112 and the static RAM (SRAM) 114, and various set-top box peripheral input/output (I/O) functions via the I/O interfaces 116.

The MPEG-2 transport demultiplexor 102 is also coupled to a digital decoding unit 118, which includes the video and audio decoders, which utilizes the decoder memory 120. The decoded information can then be used by consumer devices, such as television 122.

Figure 2:
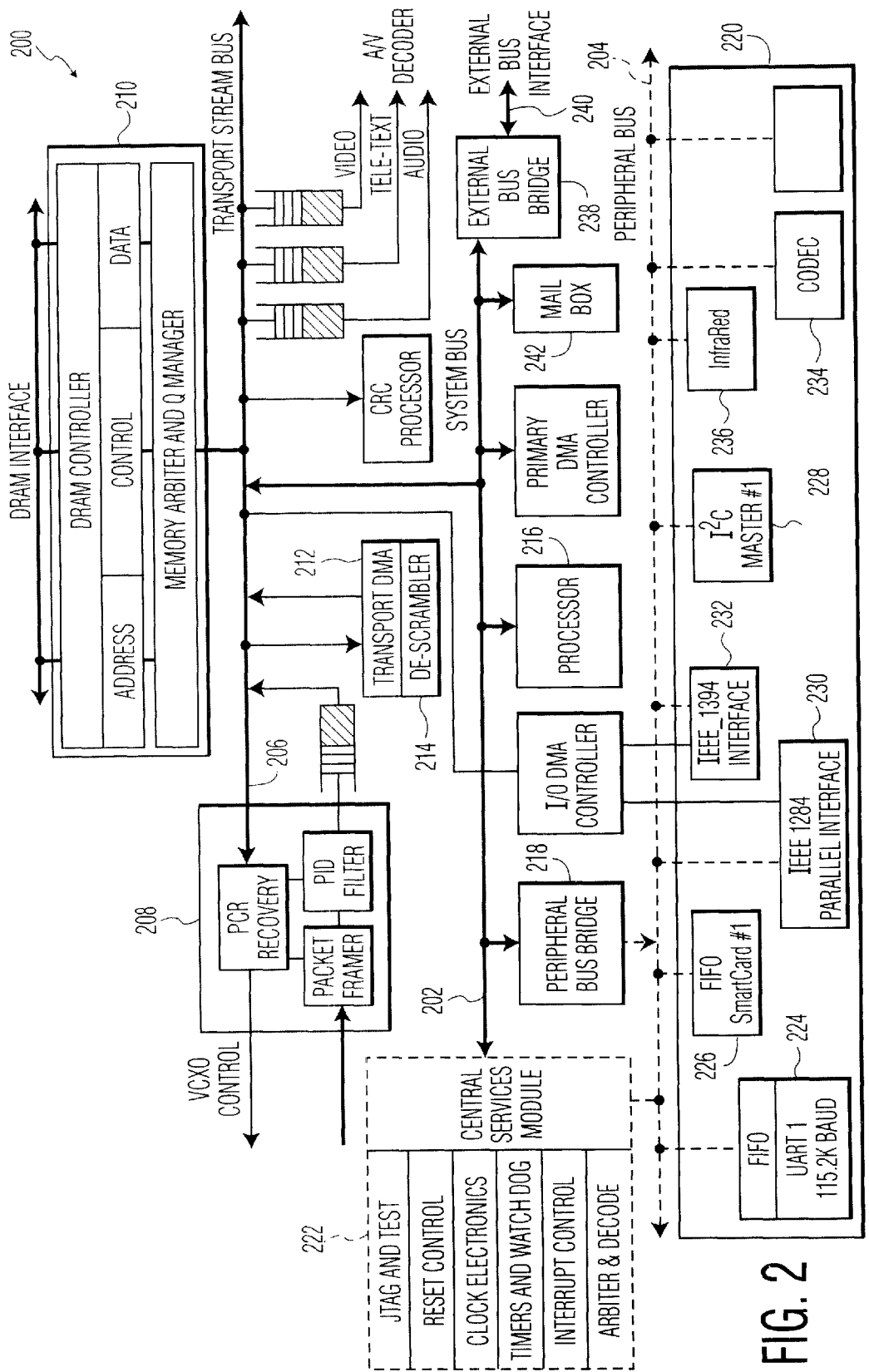
FIG. 2 is a block diagram of one embodiment of an MPEG transport demultiplexor in accordance with the present invention.

FIG. 2 is a block diagram of one embodiment of an MPEG transport demultiplexor 200 in accordance with the present invention. In the embodiment described herein, the description will discuss the MPEG-2 standard. However, as will be appreciated by those skilled in the art from the following description, the principles described herein are applicable to other packet-based technologies. While some of the general functions of the MPEG-2 transport demultiplexor 200 are described in connection with FIG. 2, more specific implementations and functions are described in greater detail in connection with the ensuing diagrams.

The MPEG-2 transport demultiplexor 200 utilizes three internal buses, including the system bus 202, peripheral bus 204, and the transport stream bus 206. The system bus 202 is the transport demultiplexor processor bus for the processor, which in one embodiment is a 32-bit bus coupled to an advanced RISC machine (ARM). The peripheral bus 204 is oriented to slow speed devices, and supports all I/O interfaces to the MPEG-2 transport demultiplexor 200. The transport stream bus 206 essentially carries all transport stream data to and from the transport memory.

The packet management module 208 receives the MPEG-2 transport packets from the front end interface demodulators. The transport packets may be input serially or in parallel bytes. The packet management module 208 provides functionality including synchronization byte detection with programmable synchronization values, synchronization byte lock and unlock hysteresis, packet alignment with programmable packet lengths, hardware packet identifier (PID) comparison, and packet discard capabilities.

A memory controller 210 includes a queue manager, arbiter, and DRAM controller. The memory controller 210 supports both EDO-DRAM and SDRAM. The queue manager provides rate buffer control for the transport stream data, while the memory controller supports a host interface for the ARM processor code and associated data space.

The transport DMA controller 212 is a scatter-gather DMA engine controlled by memory-resident data structures which establish a control program. This multi-channel DMA, together with the memory controller queue manager, provides a mechanism for memory-to-memory or I/O transfers while achieving effective rate buffering and performing associated functions for the transport stream. The transport DMA controller 212 works in conjunction with the de-scrambler 214 to decrypt the data during these memory or I/O transfers.

The processor 216 is the host processor for the MPEG-2 transport demultiplexor 200. In one embodiment of the invention, the processor 216 is an ARM having on-chip caching functionality to reduce the bandwidth requirements of the on-board memory.

The peripheral bus bridge 218 interfaces the system bus 202 to the peripheral I/O devices 220, the central services module 222, and other data registers. This bus provides connectivity to slave devices. A representative sample of many of the peripheral devices supported by the MPEG-2 transport demultiplexor 200, which includes serial I/0 224, smart card interfaces 226, I$^2$C interfaces 228, IEEE-1284 and IEEE-1394 interfaces 230, 232, codec interfaces 234 for modems, and infrared interfaces 236.

The central services module 222 provides the maintenance functions for the system. The functions handled by the central services unit include reset and power-up control, interrupt control, timer counters, bus arbitration, watch dog timers, bus timeout functions, and Joint Test Action Group (JTAG) capabilities for ARM emulation and test functionality.

The external bus bridge interfaces the system bus 202 to the external bus interface 240, and provides connectivity for external ROM, RAM, and external MPEG decoders. The external bus interface supports master and slave interfaces. The ARM 216 is the master on the external bus interface 240. The external master device can then access all of the on-chip resources of the MPEG-2 transport demultiplexor 200.

Figure 3:
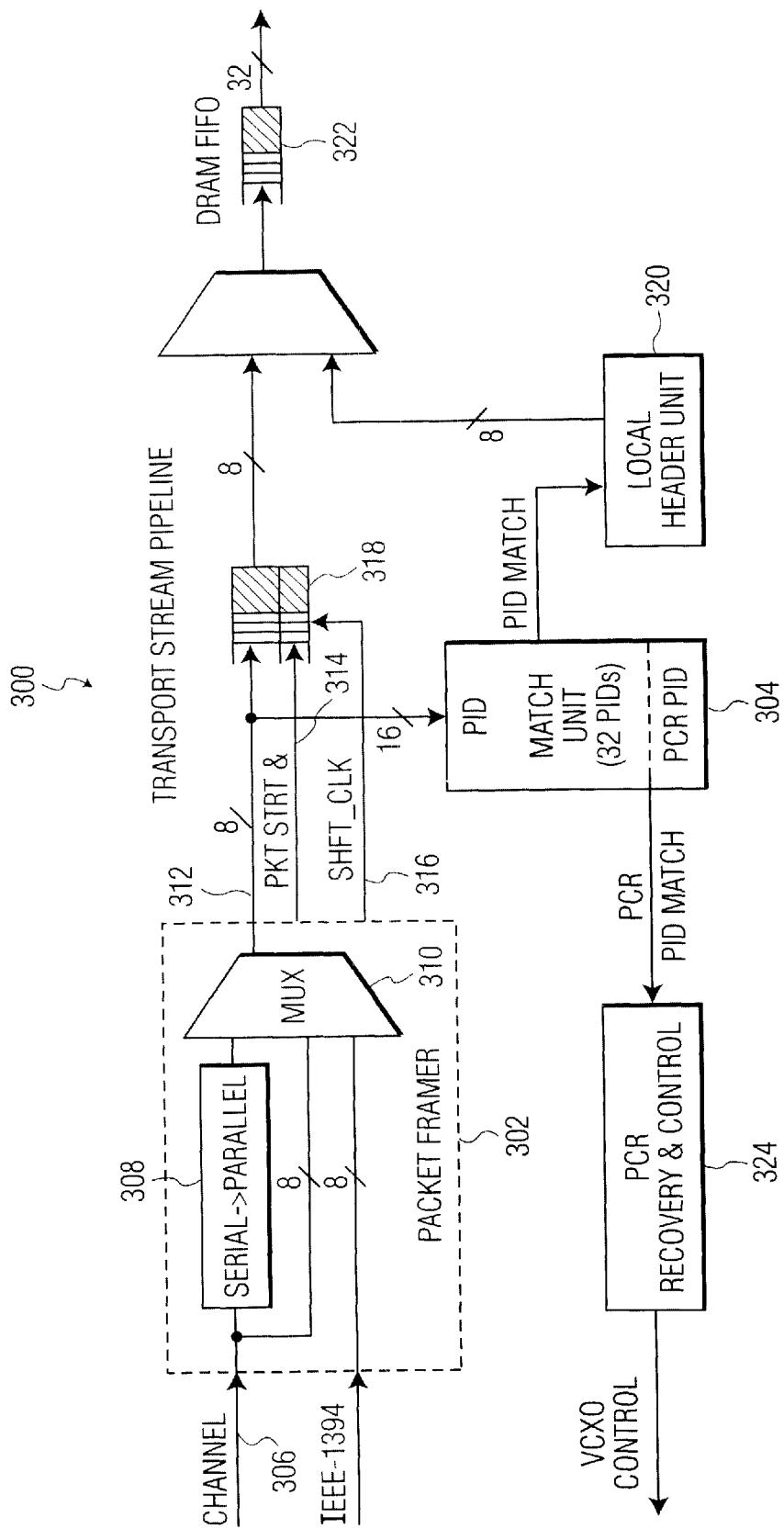
FIG. 3 is a block diagram of one embodiment of a transport packet management circuit in accordance with the present invention.

FIG. 3 is a block diagram of one embodiment of a transport packet management circuit 300 in accordance with the present invention. The packet management circuit 300 represents the transport front end, where transport packets are received at the MPEG-2 transport demultiplexor from an input channel or demodulator unit.

Generally, the packet framer 302 performs packet framing and byte alignment, as well as synchronization detection. The packet framer 302 continuously searches for the MPEG synchronization byte in the header of the incoming transport data stream. For MPEG-2 applications, the synchronization byte is used to locate the start of a transport packet, and has a hexadecimal value of 0x47. The packet framer 302 locates the synchronization byte among the rest of the transport data byte stream by tracking the arrival of synchronization bytes every transport packet interval. This is controlled by registers which establish the conditions under which the framer enters and exits a synchronization lock condition. The framer 302 forwards the data to the PID match unit 304 when an entire transport packet has been delineated from the transport data stream. For example, in a digital video broadcasting (DVB) application, the DVB transport stream is a 188-byte stream having a byte value 0x47 in the first byte of the transport header. When this value is detected a SYNC_LOCK signal is asserted, and the packet framer 302 outputs the transport packet to the PID match unit 304.

The packet framer 302 can receive inputs of various types, including serial and parallel input, as seen on channel input line 306. Where serial input is received, the serial-to-parallel converter 308 converts the input to a parallel 8-bit input to the multiplexor 310. Other interfaces, such as the IEEE-1394 standard, may also serve as inputs to the packet framer 302. A control signal coupled to the multiplexor 310 selects which input to accept to provide the transport stream at the output of the packet framer 302, which in one embodiment is provided in 8-bit bytes as shown on output bus 312. A PACKET_START signal shown on line 314 is asserted coincident with recognition of the synchronization byte to indicate the first byte of a transport packet. The PACKET_START signal triggers processing of the transport header information. The transport stream output on bus 312, the PACKET_START signal on line 314, and a SHIFT_CLOCK signal on line 316 are provided by the packet framer 302 to the transport stream pipeline 318, which is described more fully in connection with FIG. 5.

A transport packet is generally a fixed-length packet having a transport packet header and a packet payload that includes the PES packets. MPEG-2 transport packets include a transport packet header, an adaptation field, and a payload field containing the PES packets. Within the transport packet header is a packet identifier (PID), which is a 13-bit field used to identify transport packets which carry PES data from the same elementary stream, and to define the type of payload in the transport packet payload.

MPEG-2 allows for multiple audio/video programs to be provided per carrier, resulting in a multi-program transport stream (MPTS) which is a multiplex of a number of single program transport streams (SPTS). Each SPTS may contain different PES streams, each of which carries different video, audio and possibly data information all corresponding to a common program. Time division multiplexing (TDM) is used to concurrently transmit the multiple programs in an MPTS. Because the MPEG-2 transport stream can include a multiplex of audio/video programs, the MPEG transport demultiplexor 200 must determine which transport packets are part of the desired program in order to pass them on to the external MPEG decoders for further processing. The transport packets that are not part of the desired program can be discarded. The PID match unit 304 makes the determination of which PIDs are part of the desired program.

The PID match unit 304 plays an important role in multi-program transport stream management. The PID match unit 304 locates transport packets with matching PIDs, and forwards them to the local header unit 320. One aspect of the present invention is the generation of a local header by the local header unit 320. The local header is concatenated with the transport stream at the output of the transport stream pipeline 318 shown on output bus 318, and is used to distribute information throughout the transport demultiplexer. The transport packets, along with the associated local header, are forwarded to a FIFO 322 to eventually be stored to memory, which in one embodiment of the invention is a DRAM. The PID match unit 304 also includes program clock reference (PCR) PID matching, and corresponding PCR recovery circuitry 324.

In one embodiment of the invention, the PID match unit 304 includes a PID table of 32 PID entries. This table is organized as a 32-bit wide RAM with 16 locations (each location provides 2 PID entries). The table is updated by the host processor, such as processor 216 of FIG. 2. The PID table is updated when the system is first powered up and when the view changes the channel being viewed. Upon every power up sequence, the PID table is expressly updated by the host. Similarly, the host updates the PID table when a viewer performs a change channel operation. Both of these updates to the PID table are performed by the host using an alternate path to the PID match table address. A hardware interlock mechanism within the PID match unit forces the host to wait if updates are made when the PID match logic is active.

Figure 4:
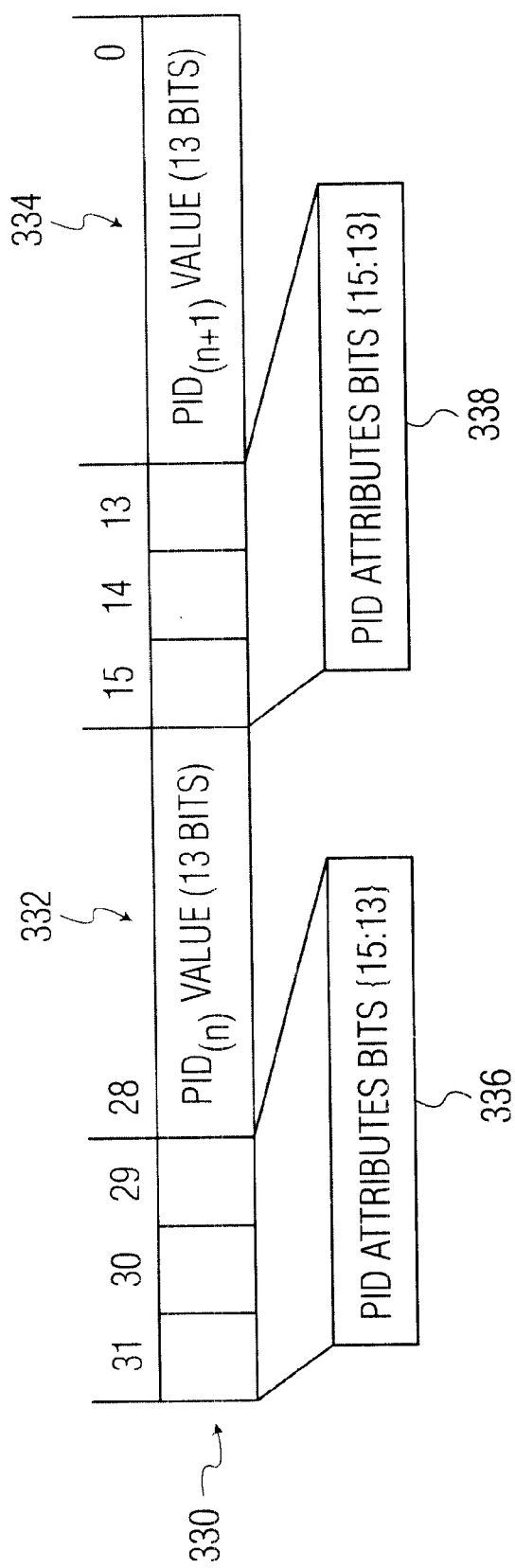
FIG. 4 illustrates the format in which predetermined PID values are stored in the PID match table.

FIG. 4 illustrates the format in which the PID values are stored in the PID match table. Table location 330 includes two PID values, shown as 13-bit $PID_{(n)}$ 332 and 13-bit $PID_{(n+1)}$ 334. Associated with each PID value is one or more attribute bits, which in one embodiment includes three attribute bits. $PID_{(N)}$ 332 is associated with attribute bits 29, 30 and 31, represented by attribute block 336. $PID_{(n+1)}$ 334 is associated with attribute bits 13, 14 and 15, represented by attribute block 338. The PID attribute details are described in Table 1 below.

TABLE 1

PID Attributes

| Bits [15:13]; [31:29] | | Description |
|---|---|---|
| 0 | X | X | Invalid PID |
| 1 | 0 | 0 | Valid PID - Transport Stream |
| 1 | 0 | 1 | Valid PID - Transport Stream (1394 Enable) |

Each of the bit patterns of the attribute block can be used to represent a particular characteristic of the PID that was received. For example, where bit 15 is binary 0, it indicates an invalid PID whether it is a PCR packet or not. Where bits 15, 14 and 13 are binary 100, it indicates a valid transport stream PID.

Figure 5:
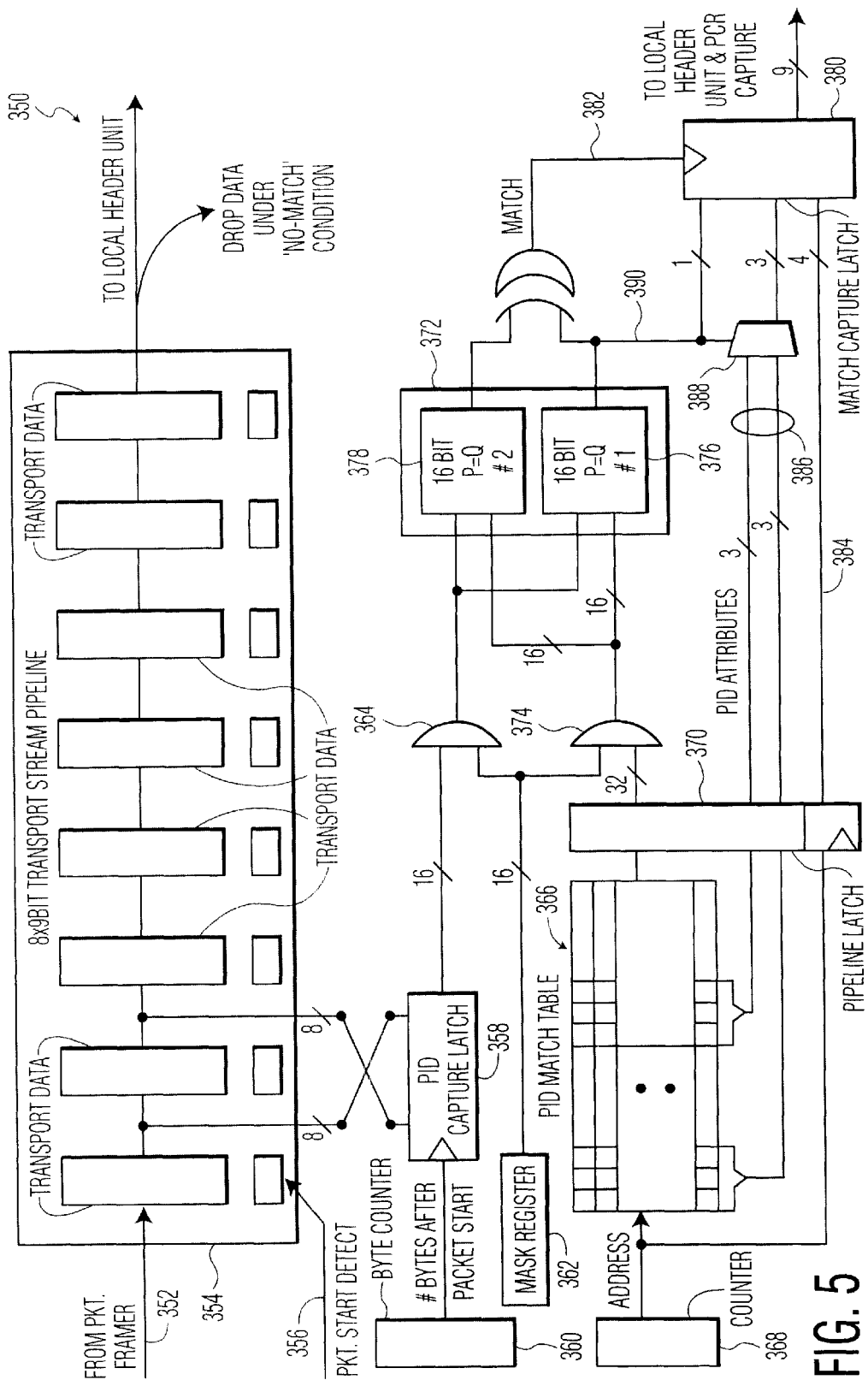
FIG. 5 is a block diagram of one embodiment of a PID match unit.

FIG. 5 is a block diagram of one embodiment of a PID match unit 350. The objective of the PID match unit 350 is to extract the PID information from the transport packets of the transport stream, for comparison with known PID table entries. The packet framer provides the transport packets to the PID match unit 350 via path 352 upon the occurrence of the SYNC_LOCK signal. The data is shifted into the transport stream pipeline 354 upon each occurrence of a shift clock after the PACKET_START signal has been detected as illustrated on line 356. The PACKET_START signal is propagated through the transport stream pipeline 354 as the transport packet propagates through the pipeline to signify the start of the transport packet. The transport stream pipeline allows the transport packets to be passed to the local header unit at the proper time. This time delay allows various functions to be performed, including locating a PID match in the PID match table, and computing the local header. For example, at a channel rate of 7.5 MB/sec (megabytes per second) and a system clock rate of 54 Mhz, it can be estimated that the PID capture time is 2 channel clock cycles for DSS and 3 channel clock cycles for DVB, which requires 3 stages of the pipeline. The PID compare time under this system clock frequency would be approximately 16 clock cycles (2 PIDs per clock cycle and 32 PIDs total), synchronization and pipeline delays of approximately 4 clock cycles, control state machine delays of approximately 4 clock cycles, and a local header computation of 4 clock cycles for a total of approximately 28 clock cycles or another 4 pipeline stages. This results in at least 7 pipeline stages, and therefore in one embodiment of the invention as shown in FIG. 5 an 8-stage transport stream pipeline provides timing assurance.

The PID capture latch 358 captures the PID information after a predetermined number of bytes past the PACKET_START signal as determined by the byte counter 360. This 16-bit value is masked using the PID mask register 362 and the AND block 364, where the result compared to the data from the PID table 366 two PIDs at a time. This masking operation is needed to obtain only the relevant bits for the comparison. The header constitutes 4 bytes of the 188 byte MPEG packet, where 2 bytes of the 130 bytes in the DSS are called pre-fix. The PID is contained within the 13 bits of information that straddles bytes 2 and 3 of a standard MPEG packet; and in the DSS format, the PID consists of 12 bits of the 2 byte pre-fix data. The PID capture latch collects a total of 16 bits. During the comparison, the non-PID bits must be ignored where the upper 3 bits are masked within the DVB and the upper 4 bits are masked within the DSS.

The compare operation is accomplished by providing a counter 368 which counts through each of the 16 locations in the PID match table 366, which enables the two PIDs at the current PID match table location to enter the pipeline latch 370, and to enter the compare unit 372 after masking by the AND block 374. The compare unit 372 includes two comparators 376 and 378 to concurrently compare the current PID value in the PID capture latch 358 to each of the PID values from the PID match table 366 at the location designated by the counter 368. Upon recognition of a match, the match capture latch 380 is updated via its clock input by the match signal shown on line 382. The match capture latch 380 provides the current counter value on path 384, as well as the PID attribute bits on paths 386 that correspond to the matched PID. Multiplexing unit 388 selects the matching PID attributes according to the state of the match bit on line 390. The match logic operates as follows: line 390 indicates that the second entry is matched. If the match 382 is true and line 390 is true, the system recognizes that the second entry is matched. If the match 382 is true and line 390 is false, the system recognizes that the first entry is matched. The line 390 also is used to select which of the two entries are to be captured into the match capture latch 380.

The PID match unit 350 stalls on the detection of a match. The match detection time for a particular entry in the PID table is deterministic, which allows for precise loop timings for PCR recovery. As will be described in greater detail in the ensuing description, the counter value on path 384 represents an address index which can be used to address particular memory queues corresponding to information identified by its PID. The address index can be used by a processing unit to generate a physical memory address where the particular transport packet will ultimately be stored prior to transmission to decoding units. The use of the address index in the local header allows a destination location to be designated without the need to develop the complete physical address until it is necessary to actually write the transport packet to its corresponding memory queue. The benefits of address indexing and a description of physical address translation may be determined in a manner described herein and in copending U.S. patent application Ser. No. 09/205,807, entitled "MPEG-2Transport Demultiplexor Architecture with Non-Time-Critical Post-Processing of Packet Information", which is assigned to the assignee of the instant application and filed concurrently herewith, the contents of which are incorporated herein by reference.

Under a match condition, the match capture latch 380 stores the PID location address from the PID match table 366 (counter 368 value), the match information on line 390, and the PID attribute bits in the following format to be forwarded to the local header unit:

TABLE 2

PID Attribute Bits

| PID MATCH[8] | PID MATCH[7:5] | PID MATCH[4] | PID MATCH[3:0] |
|---|---|---|---|
| 1 = Match<br>0 = No Match | PID Attributes | 0 = PID_data [15:0] matched<br>1 = PID_data [31:16] matched | PID_data address of match |

The PID match bits [7:5] represent the PID attributes, bit [4:0] represent the address index that is formulated by the counter 368 of FIG. 5, and bit [8] indicates whether a match was detected during the compare process. This compare process terminates on detection of a match, or upon reaching the end of the PID match table 366 in a "No Match" condition. All processor PID update cycles are inhibited during this operation, and any access attempts during a PID compare cycle are postponed. Alternatively, the processor may terminate the PID compare process to update the PID table.

Figure 6:
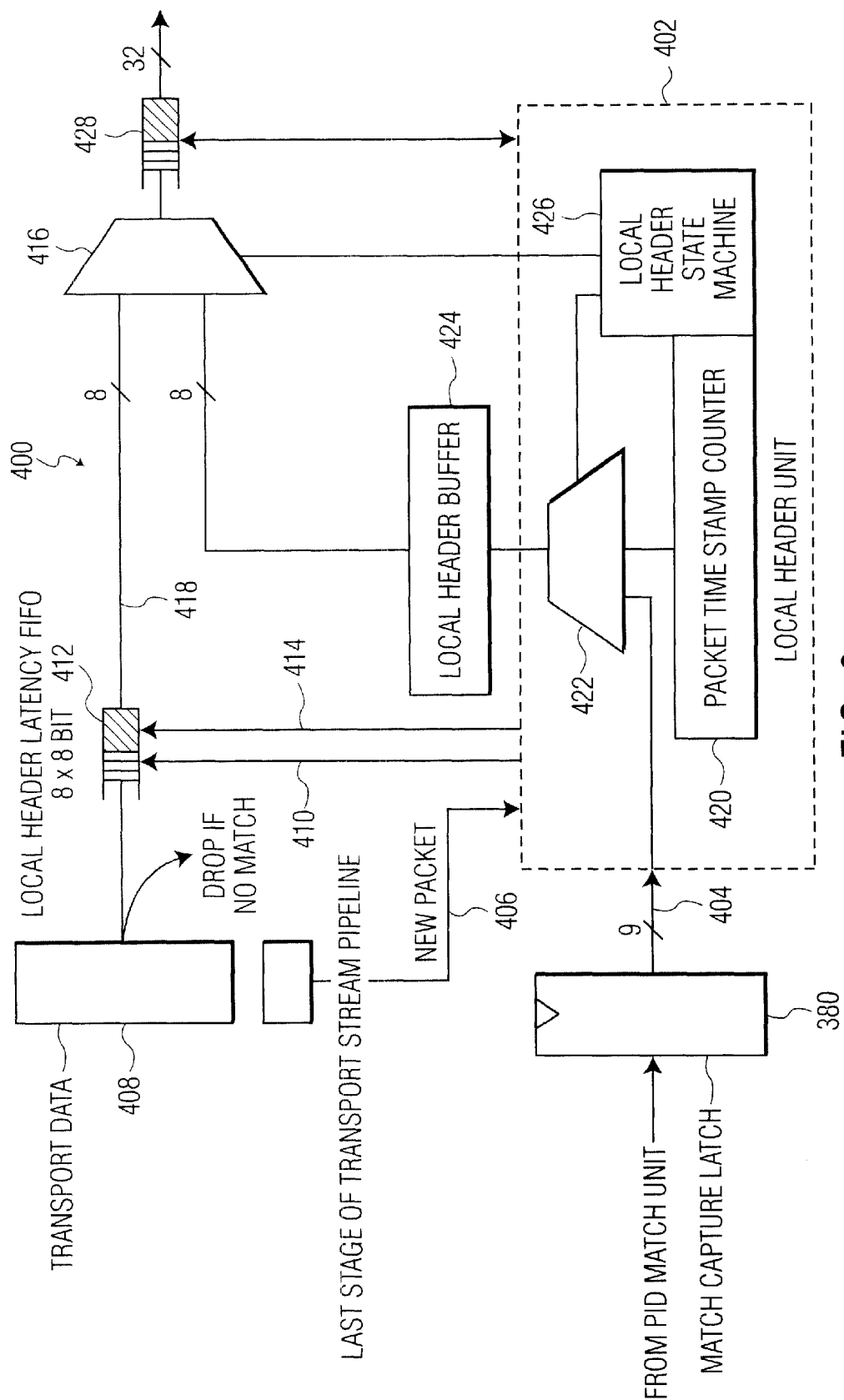
FIG. 6 is a block diagram generally illustrating the operation of the local header unit in the transport demultiplexing system.

FIG. 6 is a block diagram generally illustrating the operation of the local header unit 400 in the transport demultiplexing system. The PID match unit 350 of FIG. 5 is coupled to the local header unit 400 through the match capture latch 380, also shown in FIG. 5. The PID match output data, described in Table 2 above, is provided to the local header unit 402 via path 404. The PACKET_START signal that propagated through the transport stream pipeline 354 of FIG. 5 is also provided to the local header unit 402 via line 406 to indicate that a new transport packet has arrived. The local header unit 402 reads the match condition bit [8] from the PID match output data on path 404 to determine whether a PID match occurred. If not, the transport packet is discarded from the last stage 408 of the transport stream pipeline. If there is a match, the local header unit 402 reads the PID match attribute bits [7:5] to determine if it is a valid transport packet, and if so, provides an input enable signal on line 410 to allow the transport packet to enter the local header latency FIFO 412. The depth of the local header latency FIFO 412 is a function of both the content of the local header and the system frequency, and is designed to temporarily stage the transport packet until the local header has been generated. An output enable signal shown on line 414 enables the FIFO 412 to be read until the end of the transport packet is reached. The transport packet is provided in stages to the multiplexer 416 via path 418.

The local header unit 402 creates a unique "local" header to be inserted at the start of each transport packet. The local header unit 402 uses the PID match attributes [7:5] from path 404 to build the local header. The local header serves a variety of purposes, including generating IEEE-1394 enable information, generating time stamp information for IEEE-1394 support, providing matched PID location information, padding the packets to align bytes to the memory controller's natural boundary (burst transfer), and generating processor interrupts on arrival of particular packets (particularly PCR packets). The structure of the local header as created by the local header unit 402 is illustrated in Table 3 below.

TABLE 3

Local Header Data Structure

| Byte # | bit 7 | bit 6 | bit 5 | bit 4 | bit 3 | bit 2 | bit 1 | bit 0 |
|---|---|---|---|---|---|---|---|---|
| Byte 0 | Matched PID Location (address index) | | | | | | | |
| Byte 1 | (Reserved) | | | | 1394_En | | ATTR | ATTR |
| Byte 2 | Transport Sequence time stamp (0–255) | | | | | | | |
| Byte 3 | (Reserved) | | | | | | | |
| Byte 4–15 | (Reserved for DSS) | | | | | | | |

In one embodiment of the invention, the local header is created as depicted in Table 3, which includes between 4 to 12 bytes depending on the type of system stream provided. Where the transport packets comprise a Digital Video Broadcast (DVB) system stream, only four local header bytes are necessary. Where the transport packets comprise a Digital Satellite System (DSS) system stream, twelve local header bytes are used. The local header size is a function of the memory controller burst length and parsing information. Bytes 4–13 are reserved at this time for future use. At the present time, these bytes are marked 00. This data block is padding to fill the packets to ensure the packet length is a multiple of 16 bytes to optimize performance.

Byte 1 includes at least four fields. Bit 7 is an IEEE-1394 enable field, bits 1–2 store attribute bits. Byte 0 includes bits 0–4 are used to store the matched PID location which was determined by the PID match unit 350 of FIG. 5 and captured in the match capture latch 380. The IEEE-1394 bit in the 1394 field at bit location 2 controls the routing of the transport stream to a IEEE-1394 link controller. This bit corresponds to one of the PID attribute bits described in connection with FIG. 4 and Table 1. Particularly, this bit corresponds to the PID attribute bit at location [13] or [29] of the PID match table 366 of FIG. 5. Bits 1–0 correspond to the remaining two attribute bits associated with each PID in the PID match table.

Byte 3 in this embodiment are reserved for future expansion. Byte 2 stores a counter value generated by the local header unit, and is an incremental counter value which increments for every transport packet received, regardless of whether a PID match occurred. This counter value serves as time stamp information to retain the real-time information of the transport stream, which can be used to maintain synchronization of an IEEE-1394 interface. This 8-bit value allows for 256 time stamp values. Bytes 4–13 are not used for DVB system streams, but are used to ensure the packet lengths are multiples of 16 in DSS system streams.

Returning to FIG. 6, it can be seen that the PID attributes (including the IEEE-1394 enable attribute bit) received from path 404 are entered into bits 2–0 of byte 1 of the local header. Similarly, the matched PID location received from path 404 are entered into bits 4–0 of byte 0 of the local header. The packet time stamp counter 420 generates the incremental counter value that is stored in byte 2 of the local header. The counter value, along with DSS bytes where appropriate, are multiplexed using multiplexing unit 422 and stored in the local header buffer 424 in 8-bit segments. The local header state machine 426 controls the multiplexing unit 422 to generate the local header by outputting the information in the proper order. The local header buffer 424 buffers the local header bytes as they are provided to the multiplexing unit 416, which is also controlled by the local header state machine 426. Therefore, the local header state machine 426 controls the output of the local header unit 402 such that the local header is arranged properly, and further ensures that the local header is transmitted immediately prior to its corresponding transport packet from path 418. The local header state machine works with the following pseudo-code: Wait for packet start signal 406 if local header latency FIFO 412 is empty: a) shift the mux 416 to local header; b) push all local header bytes; c) when local header is done restore mux 416 to channel go back to waiting for next packet start signal 406.

The resulting transport packet, including its leading local header, is provided to the memory FIFO 428 for organized entry to the memory controller. In one embodiment of the invention the memory FIFO 428 and the storage memory are SRAMs, however DRAMs or other memories can be used.

Figure 7A:
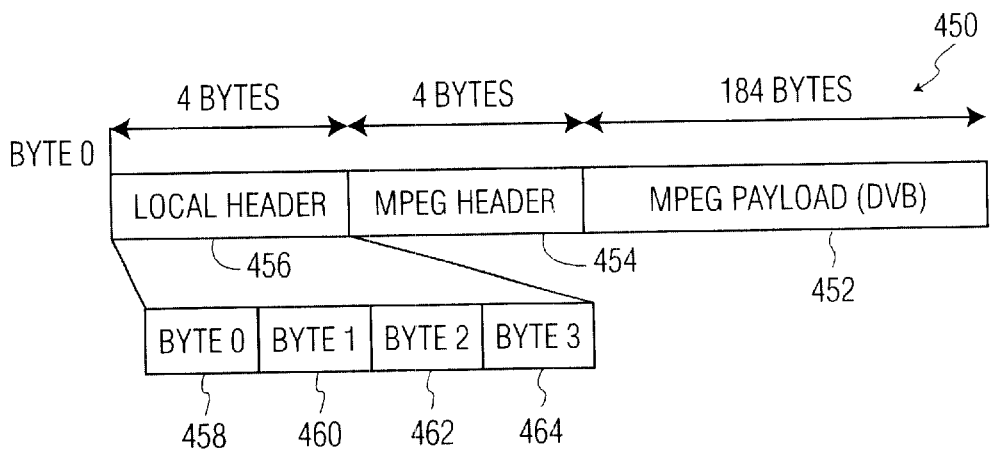
FIGS. 7A and 7B illustrate a modified transport packet, including the transport packet and its associated local header, for DVB and DSS system streams respectively.
Figure 7B:
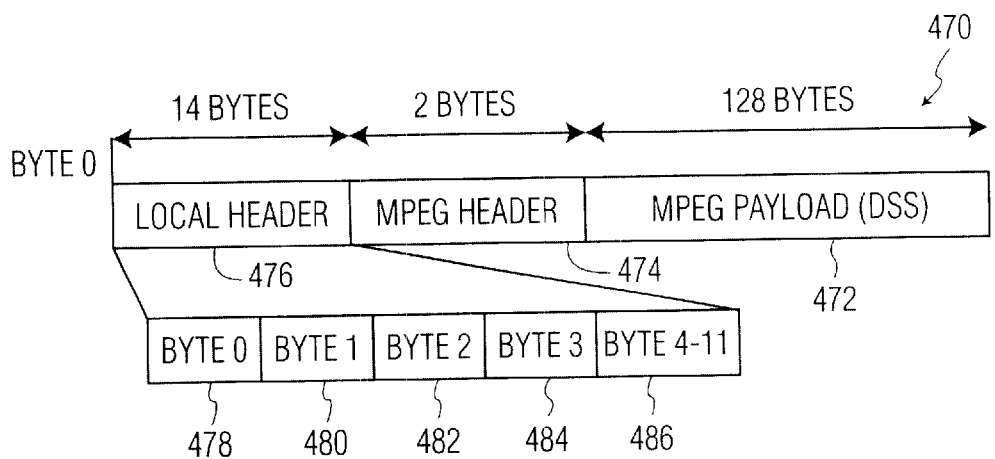

FIGS. 7A and 7B illustrate the resulting transport packet, including the transport packet and its associated local header, that is output from the multiplexing unit 416. While FIGS. 7A and 7B are described in terms of an MPEG system for DVB and DSS system streams respectively, it will be readily apparent to those skilled in the art from the description herein that other arrangements are possible.

In an embodiment in which an IEEE-1394 standard interface is initialized, a transport sequence time stamp (TSP) is contained within the local header, see byte 2 of Table 3. The IEEE-1394 interface uses this figure stamp data to keep the data output synchronized.

An IEEE-1394 interface is an isochronous interface in which packets arrive at a fixed rate. Time slots exist when packets can appear at the fixed rate; however the system needs to address the synchronization of data because packets may or may not be available for output during each time slot. The system keeps track of the number of time slots which pass between the arrival of a packet and places the number of time slots counted into the TST field. Thus, the 1394 interface can insert the correct number of time slots into the 1394 data stream when transmitting the packet. As such, the 1394 data stream will possess the same timing as the packet arrival into the system.

FIG. 7A illustrates a modified DVB MPEG transport packet 450 that has been modified by the inclusion of a local header. The DVB MPEG payload 452 includes 184 bytes of payload information, which in turn includes PES headers and payload from its corresponding elementary stream. The MPEG header 454 consists of 4 bytes, and the leading local header 456 includes 4 bytes shown as byte-0 458, byte-1 460, byte-2 462, and byte-3 464, resulting in a 192-byte "local" packet. Similarly, as shown in FIG. 7B, the modified DSS MPEG transport packet 470 includes a 128-byte DSS MPEG payload 472, and a 2-byte MPEG header 474. The local header 476 includes 12 bytes, including byte-0 478, byte-1 480, byte-2 482, byte-3 484, and byte-4 through byte 11 represented by block 486, resulting in a 144-byte "local" packet.

Figure 8:
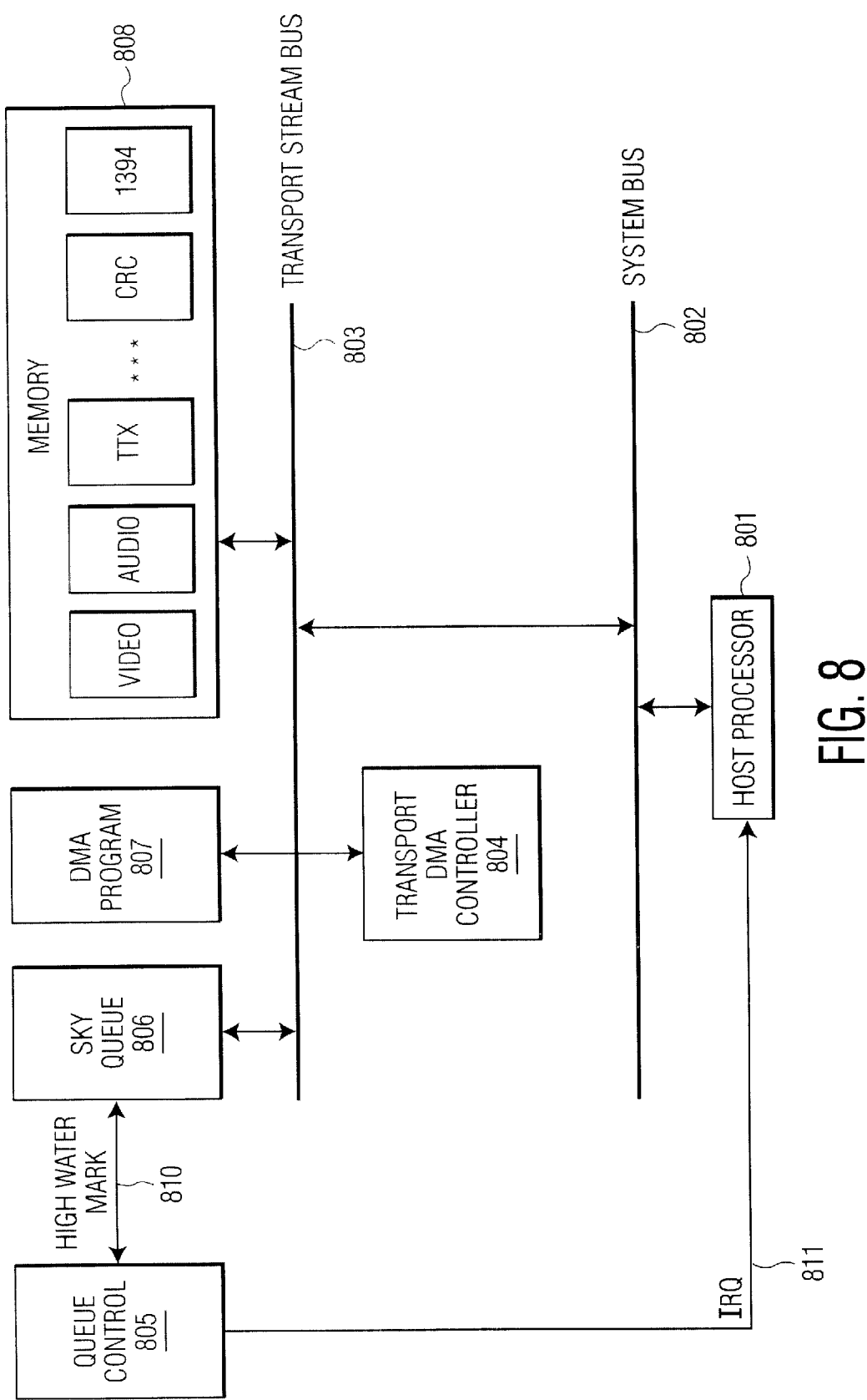
FIG. 8 is a logic block diagram illustrating a transport stream data transfer system utilizing a Direct Memory Access Controller according to one example embodiment of the present invention.

FIG. 8 is a logic block diagram illustrating a transport stream data transfer system utilizing a Direct Memory Access Controller 804. When operating, data packets are received and stored within the Sky Queue 806. Once stored within this queue, the data packets are analyzed and transferred to various separate queues in memory 808. Examples of the various queues include a video queue, an audio queue, a TTX queue, a CRC queue, and a 1394 interface queue.

The data packets are transferred from the Sky Queue to the appropriate queue by the Transport DMA controller 804 based upon a set of instructions created by the host processor 801 which have been stored in memory 807 as a set of DMA instructions. The host processor 801 creates these DMA instructions based upon the information found within the local header of each data packet. This information includes the Destination Queue Identifier which consists of the matched PID number.

The DMA transfer process begins when the Sky Queue 806 becomes one-half full. At this time, the High Water Mark 810 is asserted and Queue control logic 805 generates an interrupt service request 811 to the host processor 801. The host processor 801 reads the local headers of the data packets found within the Sky Queue 805. The host processor uses the information from the local header, along with information from the MPEG headers to create instructions for the DMA controller 804. These DMA instructions are written into memory 807 for execution by the controller 804. The DMA controller will execute these instructions to cause one of the following to occur:

The data packet is transferred without descrambling to the memory location specified by the destination address field of the DMA instruction;

The data packet is transferred without descrambling to the memory location specified by the write queue pointer, as specified by the destination address field;

The data packet is transferred without descrambling to the memory location specified by the destination address field of the DMA instruction;

The data packet is transferred with descrambling to the memory location specified by the write queue pointer, as specified by the destination address field;

The data packet is simultaneously transferred with descrambling to the memory location specified by the write queue pointer, as specified by the destination address field #2.

Figure 9:
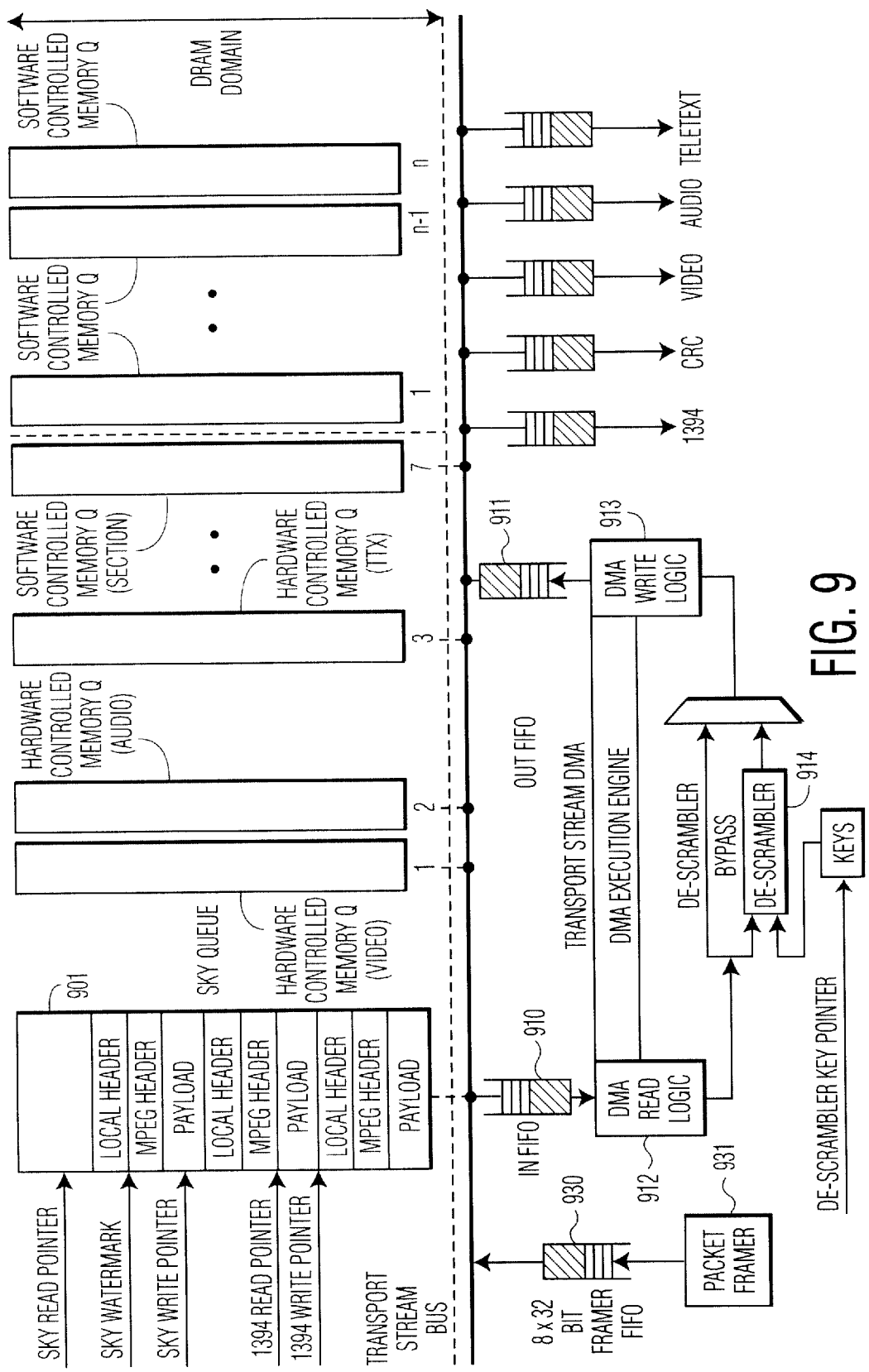
FIG. 9 is a logic block diagram illustrating an embodiment of a transport data function showing the transport data transfer logic in more detail according to one example embodiment of the present invention.

FIG. 9 is a logic block diagram illustrating an embodiment of a transport data function showing the transport data transfer logic in more detail. As described above, the data packets are received from the Packet Framer 931 into a FIFO 930 before being transferred to the Sky Queue 901. The DMA controller comprises an input FIFO 910, an output FIFO 911, DMA read logic 912, DMA write logic 913, and the de-scrambler 914. The data packets pass between the DMA read logic 912 and the DMA write logic 913 when being transferred. The data may either pass through the de-scrambler 914 or bypass it as necessary.

The host processor uses a set of pointers into the Sky Queue 901 to perform the data transfer operation. Table 4 below illustrates the various Sky Queue 901 pointers which are used. Table 4 also illustrates the producer, the writer of the pointer, and the consumer, reader of the pointer, for each of the Sky Queue Pointers.

The host processor 801 creates DMA instructions comprise 16 byte data structures illustrated below in Table 5.

TABLE 5

DMA Instruction Format

| Bits 31–23 | | Bits 23–16 | Bits 15–8 | Bits 7–0 |
| --- | --- | --- | --- | --- |
| DMA CMD | I | DSC_KEY_PTR | BYTE_COUNT | |
| Q | | SRC_ADDR | | |
| Q | | DST_ADDR | | |
| Q | | DST_ADDR2 | | |

The DMA command field "DMA CMD" determines the type of transfer performed by the DMA controller 804. One embodiment of the encoding for the DMACMD field is shown below in Table 6.

TABLE 4

Sky and IEEE- 1394 Queue Pointer Management

| FIFO Pointer | Producer/Consumer | Conditions | Comments |
| --- | --- | --- | --- |
| Sky Write Pounter | Packet Framer | Normal Operation | Stores all packets forwarded from the Packet Framer |
| Sky Read Pointer | Transport DMA | Normal Operation | All Packets are moved and optionally de-scrambled by the Transport DMA Controller |
| 1394 Write Pointer | Packet Framer | IEEE-1394 recording Scrambled or un-scrambled transport stream (un-modified) | 1394 write pointer is the alias (shadow) of the Sky Queue Write Pointer |
| | Transport DMA | IEEE-1394 Recording de-scrambler Transport data | Transport DMA writes back de-scrambled data into the Sky Queue |
| 1394 Read Pointer | IEEE-1394 Interface | IEEE-1394 Recording Transport Data | |

TABLE 6

DMA Program - DMA Command Field

| DMACMD | Command | Description |
| --- | --- | --- |
| 4'b0001 | MOVE | Execute Memory-to-Memory Transaction |
| 4'b0011 | MOVE_DSC | Memory-to-Memory Transaction with De-scrambling |
| 4'b0111 | MOVE_DSC_WR | Read and Write Back to Sky Queue with De-scrambling |
| 4'b1000 | NOP | No Operation |
| 4'b1001 | JUMP | JUMP command |
| 4'b1110 | STOP | Stop DMA Operation |

A MOVE command executes a memory-to memory move command. The memory addresses for both the source and destination pointers may be either a queue pointer or an absolute memory address. Both the source and destination pointers may reference a byte address.

A MOVE_DSC command executes a memory-to-memory data transfer using the de-scrambler 914. The DSC_KRY PTR provides the memory location for the key used in the de-scrambling operation.

A MOVE_DSC_WR commands executes a double write into memory using the de-scrambler. Both destination pointers, DST_ADDR and DST_ADDR2, are used to write data to memory ad different locations.

A NOP command involves no data transfer. The DMA controller 804 steps to the next DMA instruction.

A JUMP command allows the DMA controller to jump to the next DMA instruction specified by a destination address. The command allows the DMA controller to execute complex command sequences. The Q bits should not be set with the JUMP command.

A STOP command causes the DMA controller 804 to stop executing DMA commands.

The de-scrambler key pointer, DSC_KEY_PTR, field provides the location for the key to be used in the de-scrambling operation. The DMA controller addresses this location in the Key Table to extract the particular key to be used in de-scrambling a data packet. This key table is initialized by host processor 801 prior to the execution of the DMA instructions by the DMA controller 804.

The byte count, BYTE_COUNT, field indicates the number of bytes the particular DMA command is to transfer.

The Queue control bit field, Q, controls the decoding of the contents of the source address, SRC_ADDR, and the destination address, DST_ADDR, and destination 2, DST_ADDR2, fields. The values within the SRC_ADDR and DST_ADDR fields are decoded as physical addresses when the MSB (bit 31) is cleared. The values within the SRC_ADDR[23:16] and DST ADDR[23:16] fields are decoded as queue numbers if the MSB (bit 31) is set. The queue manager in the memory system will decode these bits as queue numbers and use the appropriate queue pointers to generate the memory addresses used for the data transfers. The values within the SRC_ADDR[15:0], DST_ADDR[15:0], and DST_ADDR2 [15:0] fields are decoded as skip addresses if Q=2'b11. The queue manager adds the value in bits [15:0] to the respective queue pointer to generate the memory addresses used in the data transfer.

Table 7 shown below illustrates the decoding performed on the DMA Q Control Field.

these fields may reference queue numbers to be used in the data transfer or may reference an absolute memory address.

Table 8, shown below, illustrates the decoding of the interrupt, I field, contained within the DMA instructions.

TABLE 8

I Field Description

| I | Field | Description |
|---|---|---|
| 1'b0 | NO_INTR | No Interrupt |
| 1'b1 | INTR | Interrupt at end of command |

Transport DMA controller 804 may be instructed to generate an interrupt service request to the host processor upon the completion of a DMA instruction. This operation allows the host processing software to track the completion of the DMA operations. The DMA controller is configured to halt its operation and generate an interrupt service request upon detection of an illegal instruction. During the execution of all illegal instructions, the DAM controller will advance to the next DMA instruction, set all necessary flags, and halt operation.

The format of the various DMA instruction formats are shown below in Tables 9–12.

TABLE 9

DMA Program with Physical Addresses

| Bits 31–24 | Bits 23–16 | Bits 15–8 | Bits 7–0 |
|---|---|---|---|
| DMA CMD 1 | DSC_KEY PTR | BYTE_COUNT | |
| 'b0x | SRC_ADDR | | |
| 'b0x | DST_ADDR | | |

TABLE 10

DMA Program with Queue Pointers and Skip Counts

| Bits 31–24 | Bits 23–16 | Bits 15–8 | Bits 7–0 |
|---|---|---|---|
| DMA CMD 1 | DSC_KEY_PTR | BYTE_COUNT | |
| 'b11 | Source Q Pointer | Skip Count | |
| 'b11 | Destination Q Pointer | Skip Count | |

TABLE 11

TABLE 7

DMA program - DMA Q Control Field

| Q Control [31:30] | Field | Description |
|---|---|---|
| 2'b0x | Queue Disable | Source/Destination Address = SCR/DST_ADDR[23:0] |
| 2'b10 | Queue Enable | Source/Destination Address = Queue Number = SCR/DST_ADDR[23:16] |
| 2'b11 | Queue Enable with Skip Enable | Queue Number - SCR/DST[23:16] + Skip No. of bytes in SCR/DST/[15:0] |

The source and destination pointers provide the DMA controller with the locations of the source data and the destination data for a DMA instruction. As described above, DMA Program for NOP and STOP Commands

| Bits 31–24 | Bits 23–16 | Bits 15–8 | Bits 7–0 |
|---|---|---|---|

| DMA CMD | I | | |
|---|---|---|---|

TABLE 12

DMA Program for JUMP Command

| Bits 31–24 | Bits 23–16 | Bits 15–8 | Bits 7–0 |
|---|---|---|---|
| DMA CMD 0x | I | Jump Address | |

The transport DMA controller 804 powers up in an idle state. The host processor 801 writes the DMA program comprising one or more DMA instructions into the main memory 807. The host processor 801 starts the DMA controller 804 by writing the initial location of the DMA program into an address register, DMA Command Address pointer, of the DMA controller 804. The DMA controller 804 wakes up and begins executing the DMA commands in the DMA program starting at the address contained within the DMA Command Address pointer. The DMA controller continues to execute commands until either a STOP command or an illegal command is decoded.

The transport DMA controller 804 optimizes read and write operations by varying the alignment and size of a transfer. The natural burst boundary of 16 bytes is achieved by the transfer operation and the DMA controller executes burst transfers for the remaining data. In normal operation, this burst transfer operation is utilized at the beginning and the end of a transfer.

Figure 10:
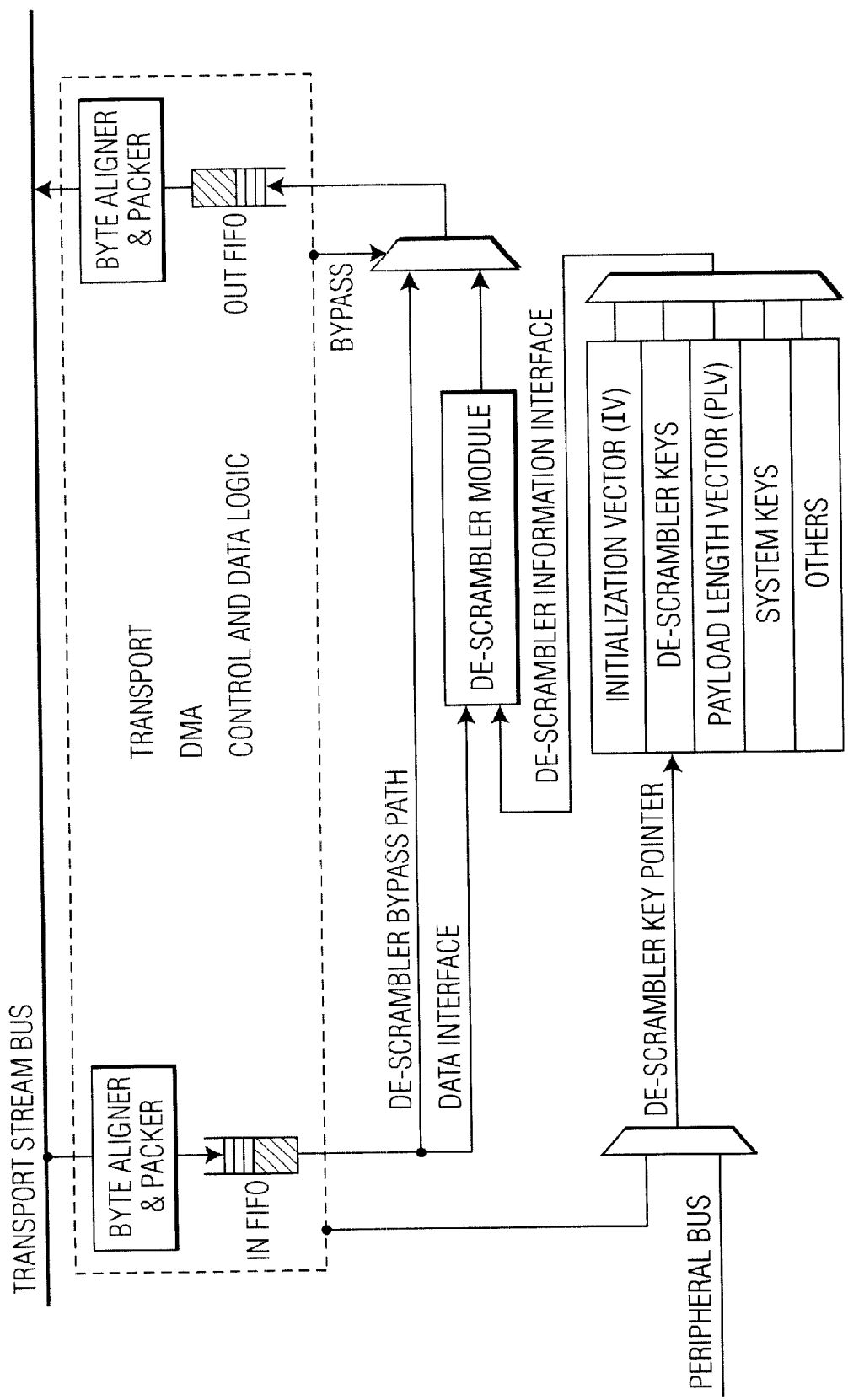
FIG. 10 is a logic block diagram illustrating the de-scrambler data functional organization according to another example embodiment of the present invention.
Figure 11:
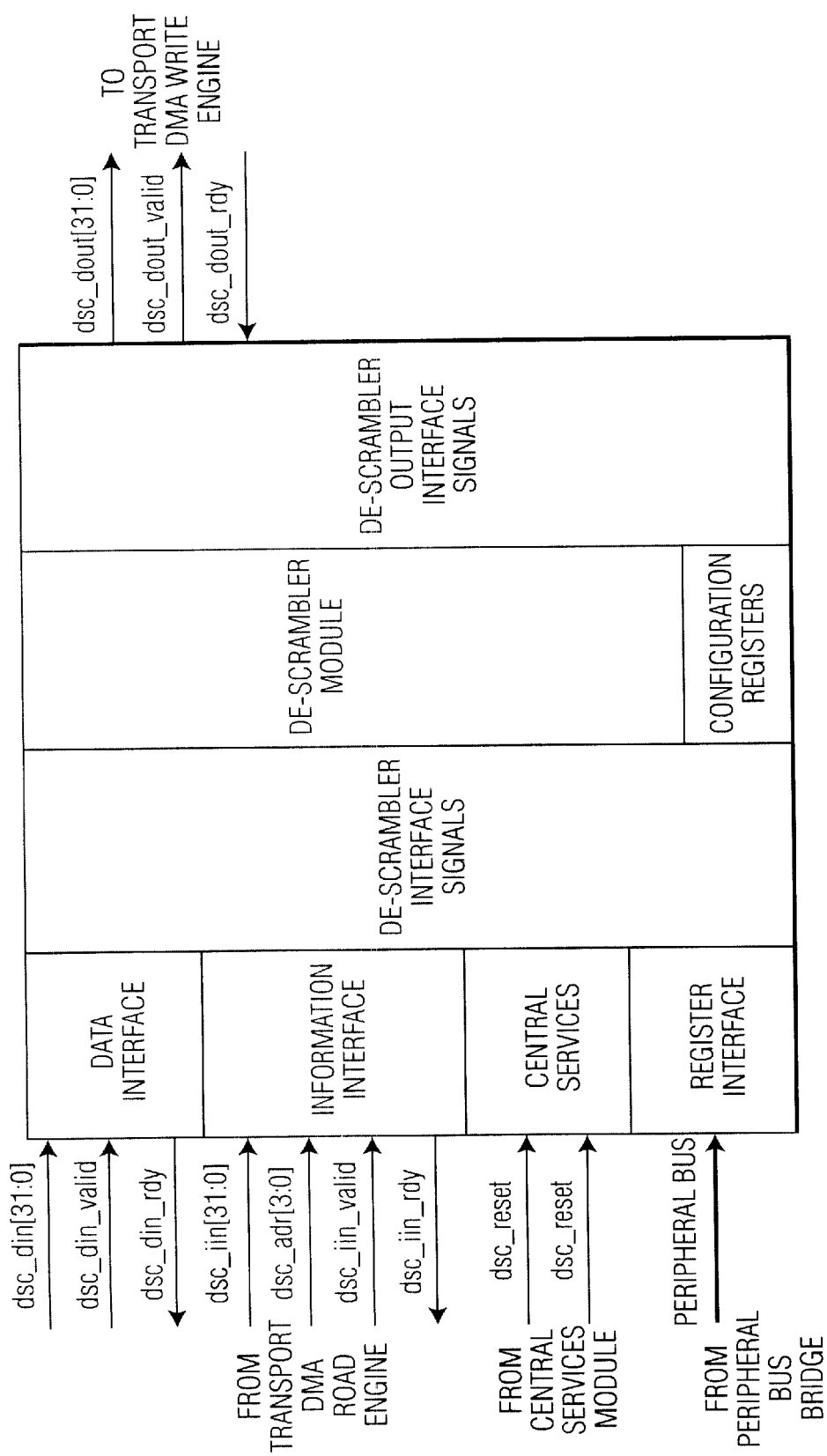
FIG. 11 is a logic block diagram illustrating the de-scrambler interfaces according to another example embodiment of the present invention.

FIG. 10 illustrates an example embodiment of a functional implementation of the Transport DMA and De-scrambler. The Transport DMA provides a data path to the de-scrambler for both scrambled data as well as de-scrambled data. A bypass path is provided for the de-scrambler to allow transport DMA engine to move un-scrambled data without intervention of the de-scrambler. Table 13, below, defines the signal descriptions for the de-scrambler and its interface. FIG. 11 illustrates an example embodiment of the de-scrambler interface and its interface signals.

The Transport DMA engine uses the data interface shown in FIG. 12 to load and unload scrambled and de-scrambled data from the de-scrambler. The information interface is used to load the control data into the de-scrambler as keys, initialization vectors, and other control information. The interface is optimized to allow independent operation of the de-scrambler once initialized. The logical sequence of data/information transfer to the de-scrambler is established by the Transport DMA.

TABLE 13

De-scrambler Interface

| Signal Name | Active | I/O | State Meaning | Timing Comments |
|---|---|---|---|---|
| | | | Data Interface Group | |
| dsc_din[31:0] Data Bus | High | Transport DMA → De-scrambler | Content: represents the state of the data during a read transaction. All bytes of the quadlet may or may not be valid. | Assertion/Negation: A data transfer occurs on the cycle where dsc_din_valid and dsc_din_rdy are asserted. Both Transport DAM and the de-scrambler may advance the data tenure on a multi-beat data transfer. |
| dsc_din_rdy De-Scrambler ready | High | De-scrambler → Transport DMA | Asserted: Indicates that the de-scrambler is ready to accept data. Transport DMA and De-scrambler must assume a transfer of data on clock cycles where dsc_din_rdy and dsc_din_valid are asserted. Negated: Transport DMA or De-scrambler must wait for the transaction to complete | Assertion: May occur during any cycle of the data transaction. May be held active to transfer multiple data beats. Negation: Must occur the cycle of the last data beat |
| dsc_din_valid De-Scrambler data is valid | High | Transport DMA → De-scrambler | Asserted: Indicates that the Transport DMA has provided data to the De-scrambler. Negated: Indicates data transfers may not continue on the bus. Any dsc_din_rdy detected by Transport DMA is ignored and the De-scrambler may not advance to the next state. | Assertion: May occur during any cycle of the data transaction. May be held active to transfer multiple data beats. Negation: May occur during any cycle |
| dsc_dout[31:0] Data Bus | High | De-scrambler → Transport DMA | Content: represents the state of the data during a read transaction. All bytes of the quadlet may or may not be valid. | Assertion/Negation: A data transfer occurs on the cycle where dsc_din_rdy and dsc_din_valid are asserted. Both Transport DMA and |

TABLE 13-continued

De-scrambler Interface

| Signal Name | Active | I/O | State Meaning | Timing Comments |
| --- | --- | --- | --- | --- |
| dsc_dout_valid De-Scrambler data is valid | High | De-scrambler → Transport DMA | Asserted: Indicates that the Descrambler has provided data to the DMA Transport. Negated: Indicates data transfers may not continue on the bus. Any dsc_dout_rdy detected by De-scrambler is ignored and the Transport DMA may not advance to the next state. | the De-Scrambler may advance the data tenure on a multi-beat data transfer Assertion: May occur during any cycle of the data transaction. May be held active to transfer multiple data beats. Negation: May occur during any cycle |
| dsc_dout_rdy De-scrambler ready | High | De-scrambler → Transport DMA | Asserted: Indicates that the Transport DMA has accepted data from the De-scrambler. If a multi-beat transfer, De-scrambler may advance to the next data transaction. Transport DMA and De-scrambler must assume a transfer of data on clock cycles where dsc_dout_rdy and dsc_dout_valid are asserted. Negated: Transport DMA or De-scrambler must wait for the transaction to complete | Assertion: May occur during any cycle of the data transaction. May be held active to transfer multiple data beats. Negation: Must occur the cycle of the last data beat |
| Information Interface Group | | | | |
| dsc_iin [31:0] Data bus | High | Transport DMA → De-scrambler | Content: represents the state of control information. dsc_adr defines the data type as Key, IV, etc. All bytes of the quadlet may or may not be valid | Assertion/Negation: a data transfer occurs on the cycle where dsc_iin_valid and dsc_iin_rdy are asserted |
| dsc_adr [3:0] Data Transaction Address (type) | High | Transport DMA → De-scrambler | Content: Specifies type of control information. Encoding varies with the De-Scrambler. | Assertion/Negation: Same timing as dsc_iin [31:0] |
| dsc_iin_rdy De-Scrambler ready | High | De-scrambler → Transport DMA | Asserted: Indicates that the De-scrambler has accepted data from the Transport DMA. Transport DMA and De-scrambler must assume a transfer of data on clock cycles where dsc_iin_rdy and dsc_iin_valid are asserted. Negated: Transport DMA or De-scrambler must wait for the transaction to complete | Assertion: May occur during any cycle of the data transaction. May be held active to transfer multiple data beats. The data lines must consist of valid data. Negation: Must occur the cycle of the last data beat |
| dsc_iin_valid De-Scrambler data is valis | High | Transport DMA → De-scrambler | Asserted: Indicates that the DMA Transport has provided data to the De-scrambler Negated: Indicates data transfers may not continue on the bus. Any dsc_iin_rdy detected by DAM Transport is ignored and the De-scrambler may not advance to the next state. | Assertion: May occur during any cycle of the data transaction. May be held active to transfer multiple data beats. Negation: May occur during any cycle |
| Central Services Module Interface Signals | | | | |
| dsc_clock | Positive | Central Service | Asserted/Negated: | dsc_clock is a free running |

TABLE 13-continued

De-scrambler Interface

| Signal Name | Active | I/O | State Meaning | Timing Comments |
|---|---|---|---|---|
| | Edge | Module → De-scrambler | primary clock signal for the de-scrambler. All timing of the interface and internal protocol is referenced to this clock. | clock signal. May or may not have any relationship to the other clocks of the module and is stoppable |
| dsc_reset | High | Central Service Module → De-scrambler | Asserted: Indicates that De-scrambler must clear its internal states and enter an idle state. Negated: Indicates that the de-scrambler may operate | Assertion: may occur during any cycle synchronous to dsc_clock Negation: May occur during any cycle synchronous to dsc_clock |

Other embodiments of the invention will be apparent to those skilled in the art from consideration of the specification and practice of the invention disclosed herein. For example, many of the principles described herein may also be applied to other digital audio/video communications systems other than those defined by the MPEG standards, or to program stream applications which typically focus on local media versus a networked environment. It is intended that the specification and examples be considered as exemplary only, with a true scope and spirit of the invention being indicated by the following claims.

What is claimed is:

1. A method for managing digital transport packet distribution in a transport packet demultiplexing system, wherein the transport packet demultiplexing system receives a transport stream including digital transport packets each identified by a packet identifier (PID), the method comprising:
   generating an address index for each of the transport packets based on the PID, wherein the address index corresponds to a memory queue address;
   generating a local header incorporating the address index for each of the transport packets;
   adding the local headers to their corresponding transport packets; and
   distributing the modified transport packet to corresponding memory queues based on their associated one of the memory queue addresses in the local header.

2. A method for managing digital transport packet distribution in a transport packet demultiplexing system, wherein the transport packet demultiplexing system receives a transport stream including digital transport packets each identified by a packet identifier (PID), the method comprising:
   generating an address index for each of the transport packets based on the PID, wherein the address index corresponds to a memory queue address;
   generating a local header incorporating the address index for each of the transport packets;
   adding the local headers to their corresponding transport packets; and
   distributing the modified transport packet to corresponding memory queues based on their associated one of the memory queue addresses in the local header, including
   reading the local headers of the transport packets,
   generating direct memory access (DMA) instructions indicating where the transport packet is to be distributed,
   storing the DMA instructions in memory, and
   transferring the transport packets using a DMA transport engine which executes the DMA instructions directly from memory.

3. The method according to claim 2, wherein the DMA transport engine transfers the transport packets as a memory-to-memory operation.

4. The method according to claim 3, wherein the memory-to-memory operation is specified using an absolute source address.

5. The method according to claim 3, wherein the memory-to-memory operation is specified using an absolute destination address.

6. The method according to claim 3, wherein the memory-to-memory operation is specified using a queue number to specify a source address.

7. The method according to claim 3, wherein the memory-to-memory operation is specified using a queue number to specify a destination address.

8. The method according to claim 3, wherein the memory-to-memory operation comprises a de-scrambling operation as the data transfer occurs.

9. The method according to claim 8, wherein the memory-to-memory operation is specified using an absolute source address.

10. The method according to claim 8, wherein the memory-to-memory operation is specified using an absolute destination address.

11. The method according to claim 8, wherein the memory-to-memory operation is specified using a queue number to specify a source address.

12. The method according to claim 8, wherein the memory-to-memory operation is specified using a queue number to specify a destination address.

13. The method according to claim 8, wherein the de-scrambling operation uses a key stored within a key table.

14. The method according to claim 13, wherein the key used in a de-scrambling operation is selected by a key pointer.

15. The method according to claim 3, wherein the memory-to memory operation comprises:
   a memory read operation from a source address;
   a first memory write to a first destination address; and
   a second memory write to a Sky Queue using a second destination address.

16. The method according to claim 15, wherein the memory-to-memory operation further comprises a de-scrambling as the data transfer occurs using a key stored in a key table, the key is selected using a key pointer.

17. The method according to claim 16, wherein the source address is an absolute memory address.

18. The method according to claim 16, wherein the source address is a queue number.

19. The method according to claim 16, wherein the first destination address is an absolute memory address.

20. The method according to claim 16, wherein the first destination address is a queue number.

21. The method according to claim 16, wherein the second destination address is an absolute memory address.

22. The method according to claim 16, wherein the second destination address is a queue number.

23. The method according to claim 3, wherein the completion of the memory-to-memory operation comprises a interrupt service request be sent to a host processor.

24. A method for managing digital transport packet distribution in a transport packet demultiplexing system, wherein the transport packet demultiplexing system receives a transport stream including digital transport packets each identified by a packet identifier (PID), the method comprising:

generating an address index for each of the transport packets based on the PID, wherein the address index corresponds to a memory queue address;

generating a local header incorporating the address index for each of the transport packets;

adding the local headers to their corresponding transport packets; and distributing the modified transport packet to corresponding memory queues based on their associated one of the memory queue addresses in the local header;

wherein the distributing step comprises:

reading the local headers of the transport packets;

generating direct memory access (DMA) instructions indicating where the transport packet is to be distributed;

storing the DMA instructions in memory; and transferring the transport packets using a DMA transport engine which executes the DMA instructions directly from memory; and the DMA transport engine transfers the transport packets as a memory-to-memory operation, the memory-to-memory operation selectively comprises a de-scrambling as the data transfer occurs using a key stored in a key table, the key is selected using a key pointer.

25. An apparatus for managing digital transport packet distribution in a transport packet demultiplexing system, wherein the transport packet demultiplexing system receives a transport stream including digital transport packets each identified by a packet identifier (PID), the apparatus comprising:

means for generating an address index for each of the transport packets based on the PID, wherein the address index corresponds to a memory queue address;

means for generating a local header incorporating the address index for each of the transport packets;

means for adding the local headers to their corresponding transport packets; and means for distributing the modified transport packet to corresponding memory queues based on their associated one of the memory queue addresses in the local header;

wherein the distributing means comprises:

means for reading the local headers of the transport packets;

means for generating direct memory access (DMA) instructions indicating where the transport packet is to be distributed;

means for storing the DMA instructions in memory; and means for transferring the transport packets using a DMA transport engine which executes the DMA instructions directly from memory; and the DMA transport engine transfers the transport packets as a memory-to-memory operation and the memory-to-memory operation selectively comprises a de-scrambling means using a key stored in a key table.

\* \* \* \* \*